P. H. HERBERT.
ORDER GUIDE.
APPLICATION FILED MAY 29, 1914.

1,244,089.

Patented Oct. 23, 1917.

| Dimension Number | Distance Between Lenses | Pupillary Distance | | | | Height | | Inclination | |
|---|---|---|---|---|---|---|---|---|---|
| | | 1 Eye | 0 Eye | 00 Eye | 000 Eye | | | | |
| | MM. | MM. | MM. | MM. | MM. | MM. | IN. | MM. | IN. |
| 0412 | 17.25 | 54.25 | 55.75 | 57.25 | 58.25 | 1.5 | $\frac{1}{16}$ | 3 | $\frac{2}{16}$ |
| 0533 | 18.75 | 55.75 | 57.25 | 58.75 | 59.75 | 5 | $\frac{3}{16}$ | 5 | $\frac{3}{16}$ |
| 0622 | 20.25 | 57.25 | 58.75 | 60.25 | 61.25 | 3 | $\frac{2}{16}$ | 3 | $\frac{2}{16}$ |

Dimensions Based on 00 Eye

The first figure "0" indicates "the Bridge". The second figure indicates the pupillary distance in sixteenths of an inch above two inches for 00 eye lenses; the third figure indicates the height of the bridge in sixteenths; and the fourth figure indicates the inclination of the bridge in sixteenths WITNESSES:
Joseph J. D. Emery
William A. Gunning.

INVENTOR
PITT. H. HERBERT
BY
H. H. S. Tytle r A. K. Parsons
ATTORNEYS

UNITED STATES PATENT OFFICE.

PITT H. HERBERT, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

ORDER-GUIDE.

1,244,089.      Specification of Letters Patent.      Patented Oct. 23, 1917.

Application filed May 29, 1914. Serial No. 841,966.

*To all whom it may concern:*

Be it known that I, PITT H. HERBERT, a citizen of the United States, residing at Southbridge, in the county of Worcester and State of Massachusetts, have invented certain new and useful Improvements in Order-Guides, of which the following is a specification.

My invention relates to improvements in guides and has particular reference to an improved device for use in the ordering of ophthalmic mountings.

The leading object of my invention is the provision of an improved guide for use in the placing of orders for ophthalmic mountings which will greatly lessen the labor attendant upon making out of the order, in that by reference to my improved guide certain arbitrary symbols together forming a single number may be employed to denote the various measurements of the mounting desired in place of it being necessary to use a plurality of descriptive words accompanied by the various measurements desired to be given.

A further object of my invention is the provision of an improved order guide in which certain symbols are combined to make a number descriptive of various styles of mountings, and which shall also embody explanatory matter indicating and setting out in detail the various points contained within the number or combination of symbols.

Other objects and advantages of my improved order guide should be readily apparent by reference to the following description taken in connection with the accompanying drawings, and it will be understood that I may make any modifications in the specific details of construction shown and described within the scope of the appended claims without departing from or exceeding the spirit of my invention.

The drawing represents a view of an order guide with three bridge size dimensions and other corresponding features shown thereon, it being understood that in actual use a much greater variety of dimension numbers are ordinarily placed upon the guide with corresponding information in the several following columns and the use and structural features of my order guide in enlarged form will be identical with that hereinafter described.

By reference to the drawing it will be noted that I have divided my guide into a number of columns numbered respectively as follows: Column No. 1 is entitled "Dimension number," this column containing the serial number made up from the various units in accordance with the accompanying explanation.

Column No. 2 indicates the distance between the centers of the lenses, or what is commonly termed the pupilary distance of the mounting, this same column 2 being subdivided into four parts, numbers 3, 4, 5 and 6, serving respectively to denote in millimeters the pupilary distance for size 1, size 0, size 00 and size 000 eye lenses.

Column number 7 is employed to denote the height of the bridge, being subdivided into subcolumns 8 and 9, denoting the said height respectively in millimeters and in sixteenths of an inch.

Column number 10 serves to denote the inclination of the bridge of the mounting from the plane of the lenses thereof, it being subdivided into subcolumns 11 and 12, denoting said measurements respectively in millimeters and in sixteenths of an inch.

Column No. 13 indicates the distance between the inner edge of the lenses, or in other words, the width of bridge used upon noses of varying sizes.

It is to be understood that I do not intend to limit myself to the specific arrangement illustrated and above described but that the positions of the columns may be varied and certain of the same eliminated or additional columns supplied as may prove desirable.

As illustrated in addition to the various columns above mentioned, a further explanation may be added as to just what constitutes the dimension or serial number, the particular explanation reading as follows: The first figure "0" indicates the bridge; the second figure indicates the pupilary distance in sixteenths of an inch above two inches for 00 eye lenses; the third figure indicates the height of the bridge in sixteenths; and the fourth figure indicates the inclination of the bridge in sixteenths.

For example let it be assumed that the patient's measurements have been taken and it has been found that the pupilary distance of the patient is 58.75 millimeters, that the distance between the inner edges of the lenses as indicated in column 13 is 18.75 millimeters, and that the height and inclination of the bridge are 3 and 3, respectively, the 3 and 3 designating the height and inclination of the bridge beyond a horizontal and vertical meridian in sixteenths of an inch. The person taking the measurements refers to the horizontal row of figures in the guide and locates the row having all of the measurements mentioned contained therein, and when such row has been located it will be apparent that it is only necessary to refer to the first column of figures designated at the top "Dimension number" which in the instance mentioned reads 0533, the 0 designating a narrow bridge, the 5 designating the pupilary distance between the lenses of $2\frac{5}{16}$ inches, or 18.75 millimeters, and the two remaining figures designating in sixteenths of an inch the height and inclination of the bridge respectively. It is to be understood that other characters in place of the 0 may be used to designate other styles of bridges, the present chart being made out especially for bridges of a narrow construction.

In the first column of figures designated "Dimension number" the 0 is an arbitrary symbol used to denote a specific construction of bridge, different styles of bridges being denoted by symbols other than the 0. The second number indicates the pupilary distance in sixteenths of an inch over the arbitrarily fixed standard of two inches between the lenses. The third number indicates the height of the bridge in sixteenths of an inch above the arbitrarily fixed standard of a horizontal meridian. The fourth number indicates the inclination of the bridge in sixteenths of an inch over the arbitrarily fixed standard of a vertical meridian.

It will be only necessary to locate the column having the distance between the lenses corresponding with the patient's measurements. Then read horizontally across the column until the pupilary distance is reached, and then by reference to the upper portion of said column read the standard size of lens needed, the four standard sizes of lenses being designated 1, 0, 00 and 000, respectively, and it will be seen that in this instance a 00 lens would be required.

From the foregoing description, the construction and purpose of my improved order chart should be readily apparent and it will be seen that I have provided a dimension or serial number for use in the ordering of mountings comprised of an arbitrary symbol used to denote the style of the bridge, another symbol denoting the excess of the pupilary width of the mounting over an arbitrarily fixed standard, and other symbols denoting the variation of other symbols of the mounting over other arbitrarily fixed standards, the actual measurements indicated by the various units in the dimension or serial number, etc., being pointed out in the columns following the column containing the dimension number and in the further explanation printed therebelow. It will thus be seen that by the use of my improved order chart one may readily make out an order for a number of mountings each of a different size with a minimum amount of labor and at the same time definitely and accurately bring out in such way as to be clearly understood the various dimensions of each of the mountings desired.

I claim:

1. As an article of manufacture, an order card for ophthalmic mountings, comprising a series of columns having the variable dimensions of different ophthalmic mountings arranged in different rows in the columns each row containing the dimension for a particular mounting, and an additional column containing an order number composed of the variable dimensions of certain of the other columns in the corresponding row expressed as a number.

2. As an article of manufacture, an order card for use in the purchase of ophthalmic mountings, comprising a plurality of consecutive columns bearing rows of dimension numbers extending in alinement across the several columns and an additional column bearing a dimension number formed by arbitrary selection of certain symbols or their equivalent from predetermined columns in the row.

3. As an article of manufacture, an order card for use in purchase of ophthalmic mountings, comprising a series of main columns, means for designating the particular essential measurement of an ophthalmic mounting to be found in the respective columns, certain of said columns being subdivided to contain the same measurement in different standards of measure, and one of the additional columns being subdivided into a plurality of minor columns suitably designated and bearing means to indicate possible dimensional variations in the complete ophthalmic mounting attainable in connection with a standard center by the selection of the variable member indicated at the top of such minor columns, and an additional major column bearing a dimension number built up from the several main dimensional columns to indicate the particular measurement of ophthalmic mountings necessary to fulfil the required conditions.

4. As an article of manufacture, an order card for use in the purchase of ophthalmic mountings, comprising a series of main columns, means for designating the particular essential measurement of an ophthalmic mounting to be found in the respective columns, certain of said columns being subdivided to contain the same measurement in different standards of measure, and one of the additional columns being subdivided into a plurality of minor columns suitably designated and bearing means to indicate possible dimensional variations in the complete ophthalmic mounting attainable in connection with a standard center by the selection of the variable member indicated at the top of such minor columns, and an additional major column bearing a dimension number built up from the several main dimensional columns to indicate the particular measurement of ophthalmic mountings necessary to fulfil the required conditions, and an undivided space on the card immediately adjacent the columns containing matter explanatory of the use of the several columns.

In testimony whereof I affix my signature in presence of two witnesses.

PITT H. HERBERT.

Witnesses:
WM. STARK,
H. K. PARSONS.